United States Patent
Shin et al.

(10) Patent No.: US 11,601,629 B2
(45) Date of Patent: Mar. 7, 2023

(54) IMAGE SENSORS, CALIBRATION METHODS OF IMAGE SENSORS, AND ELECTRONIC DEVICES FOR CALIBRATING IMAGE SENSORS

(71) Applicant: Samsung Electronics Co., Ltd., Suwon-si (KR)

(72) Inventors: Deokha Shin, Seoul (KR); Youngjun Choi, Seoul (KR); Tae-Shick Wang, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 140 days.

(21) Appl. No.: 17/027,898

(22) Filed: Sep. 22, 2020

(65) Prior Publication Data

US 2021/0258553 A1   Aug. 19, 2021

(30) Foreign Application Priority Data

Feb. 17, 2020 (KR) .................. 10-2020-0019240

(51) Int. Cl.
*H04N 9/73* (2006.01)
*H04N 9/04* (2006.01)

(52) U.S. Cl.
CPC ......... *H04N 9/735* (2013.01); *H04N 9/04515* (2018.08); *H04N 9/04551* (2018.08); *H04N 9/04555* (2018.08); *H04N 9/04559* (2018.08)

(58) Field of Classification Search
CPC .... H04N 9/735; H04N 9/04551; H04N 17/00; H04N 9/04557; H04N 5/3182; H04N 9/73; G06T 7/80; H01L 27/14601

See application file for complete search history.

(56) References Cited

U.S. PATENT DOCUMENTS

| | | | |
|---|---|---|---|
| 9,179,113 B2 | 11/2015 | Tachi | |
| 9,324,132 B2 | 4/2016 | Kim et al. | |
| 10,110,825 B2 | 10/2018 | Kurata et al. | |
| 10,200,664 B2 | 2/2019 | Kaizu | |
| 2009/0207274 A1* | 8/2009 | Park | H04N 9/735 348/E5.031 |
| 2016/0260197 A1* | 9/2016 | Hada | H04N 1/6008 |
| 2018/0070067 A1 | 3/2018 | Knight et al. | |
| 2019/0174107 A1* | 6/2019 | Miyake | G06T 7/90 |
| 2020/0320743 A1* | 10/2020 | Zhao | G06T 7/11 |
| 2020/0404235 A1* | 12/2020 | Moriya | H04N 5/225 |
| 2021/0014530 A1* | 1/2021 | Ando | H04N 19/593 |
| 2021/0377504 A1* | 12/2021 | Jang | H04N 9/04557 |

FOREIGN PATENT DOCUMENTS

JP   H11-308634 A   11/1999
KR   10-0763656 B1   10/2007

* cited by examiner

*Primary Examiner* — Abdelaaziz Tissire
(74) *Attorney, Agent, or Firm* — Harness, Dickey & Pierce, P.L.C.

(57) ABSTRACT

A method of calibrating an image sensor including a color filter array having a first-type array pattern, the method includes capturing a target using the image sensor to generate first image data, performing a white balance operation on the first image data to generate second image data, performing an inverse white balance operation on the second image data based on a second-type array pattern to generate third image data, the second-type array pattern being different from the first-type array pattern, and calibrating the image sensor based on the third image data.

19 Claims, 12 Drawing Sheets

FIG. 4

IMAGE SENSORS, CALIBRATION METHODS OF IMAGE SENSORS, AND ELECTRONIC DEVICES FOR CALIBRATING IMAGE SENSORS

CROSS-REFERENCE TO RELATED APPLICATIONS

This application claims priority under 35 U.S.C. § 119 to Korean Patent Application No. 10-2020-0019240 filed on Feb. 17, 2020, in the Korean Intellectual Property Office, the disclosures of which are incorporated by reference herein in their entireties.

BACKGROUND

Some example embodiments described herein relate to a semiconductor device, and more particularly, relate to an image sensor capable of reducing a calibration time, a calibration method of the image sensor, and/or an electronic device calibrating the image sensor.

An image sensor may generate image data of a target or a scenery by capturing the target or the scenery. As performances of mobile devices such as a smart phone and a smart pad have improved, image sensors have been employed in the mobile devices. The image sensors employed in the mobile devices generate image data, and thus, the image sensors may be used to create image-based content.

After image sensors are manufactured and before the image sensors are coupled to mobile devices, the image sensors may be calibrated. Calibrating an image sensor may include adjusting a resolution by adjusting a distance between a lens and pixels of the image sensor or adjusting a tilt of the lens by horizontally positioning the lens and the pixels of the image sensor. When the image sensor is completely calibrated, the image sensor may have a performance meeting design specifications of the image sensor.

As the number of electronic devices (or mobile devices) employing image sensors increases and as the number of image sensors employed in each electronic device (or mobile device) increases, the demand of image sensors may increase rapidly. Image sensor calibration delay may increase a manufacturing time of an image sensor, thereby causing an increase in manufacturing costs of the image sensor.

SUMMARY

Some example embodiments provide an image sensor having a reduced calibration time, a calibration method of the image sensor, and/or an electronic device calibrating the image sensor.

According to some example embodiments, a method of calibrating an image sensor including a color filter array having a first-type array pattern, the method includes capturing a target using the image sensor to generate first image data, performing a white balance operation on the first image data to generate second image data, performing an inverse white balance operation on the second image data based on a second-type array pattern to generate third image data, the second-type array pattern being different from the first-type array pattern, and calibrating the image sensor based on the third image data.

According to some example embodiments, an image sensor includes a lens, a color filter array under the lens, the color filter array including a plurality of color filters having a first array pattern, a pixel array under the color filter array, the pixel array including a plurality of pixels respectively corresponding to the plurality of color filters, and the pixel array being configured to sense light incident through the lens and the color filter array, and processing circuitry configured to digitize the light sensed by the pixel array to generate first image data, perform a white balance operation on the first image data to generate second image data, and perform an inverse white balance operation on the second image data based on a second array pattern to generate third image data, the second array pattern being different from the first array pattern.

According to some example embodiments, an electronic device includes processing circuitry configured to perform a white balance operation on first image data received from an image sensor to generate second image data, the image sensor including a color array of a first-type array pattern, perform an inverse white balance operation on the second image data based on a second-type array pattern to generate third image data, the second-type array pattern being different from the first-type array pattern, and generate a signal for calibrating the image sensor based on the third image data.

BRIEF DESCRIPTION OF THE FIGURES

The above and other objects and features of some example embodiments will become apparent by describing in detail examples thereof with reference to the accompanying drawings.

FIG. 4 illustrates an example of color filters arranged depending on a second-type array pattern of a second color filter array.

DETAILED DESCRIPTION

Below, some example embodiments may be described in detail and clearly to such an extent that one of ordinary skill in the art may easily implement the same.

Figure 1:
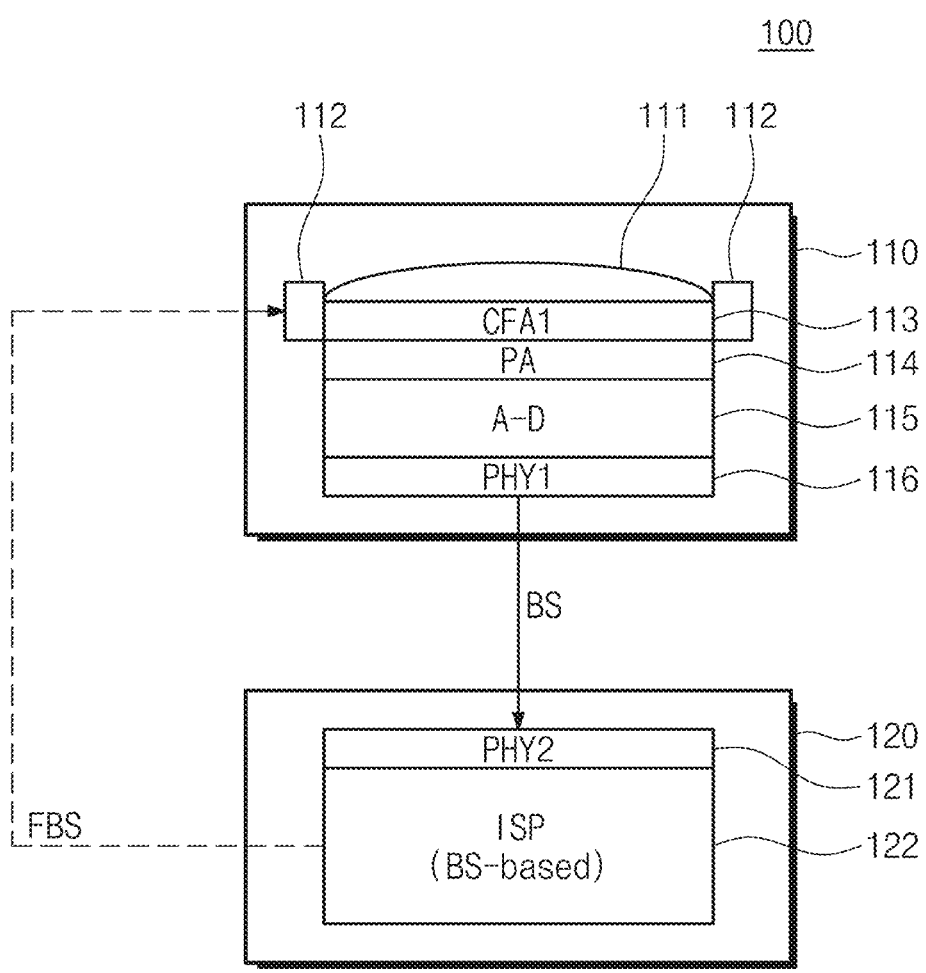
FIG. 1 illustrates an image sensor calibration system according to some example embodiments.

FIG. 1 illustrates an image sensor calibration system 100 according to some example embodiments. Referring to FIG. 1, the image sensor calibration system 100 may include an image sensor 110, and/or an electronic device 120 configured to calibrate the image sensor 110.

The image sensor 110 may be based on a complementary metal-oxide-semiconductor (CMOS) image sensor (CIS) or a charge-coupled device (CCD). The image sensor 110 may include a lens 111, a support 112, a first color filter array 113 (CFA1), a pixel array 114 (PA), an analog-to-digital block 115 (A-D), and/or a first physical block 116 (PHY1). According to some example embodiments, operations described herein as being performed by the image sensor calibration system 100, the image sensor 110, the electronic device 120, the first color filter array 113 (CFA1), the pixel array 114 (PA), the analog-to-digital block 115 (A-D) and/or the first physical block 116 (PHY1) may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The lens 111 may transfer light incident from the outside to the first color filter array 113. The support 112 may be a structure for supporting the lens 111. The support 112 may be configured to adjust a distance between the lens 111 and the first color filter array 113 or a distance between the lens 111 and the pixel array 114. The support 112 may be configured to adjust a tilt between the lens 111 and the first color filter array 113 and/or a tilt between the lens 111 and the pixel array 114.

The first color filter array 113 may include color filters that are applied to light incident through the lens 111. The first color filter array 113 may have a first-type array pattern. The color filters of the first color filter array 113 may be arranged depending on the first-type array pattern.

Figure 2:
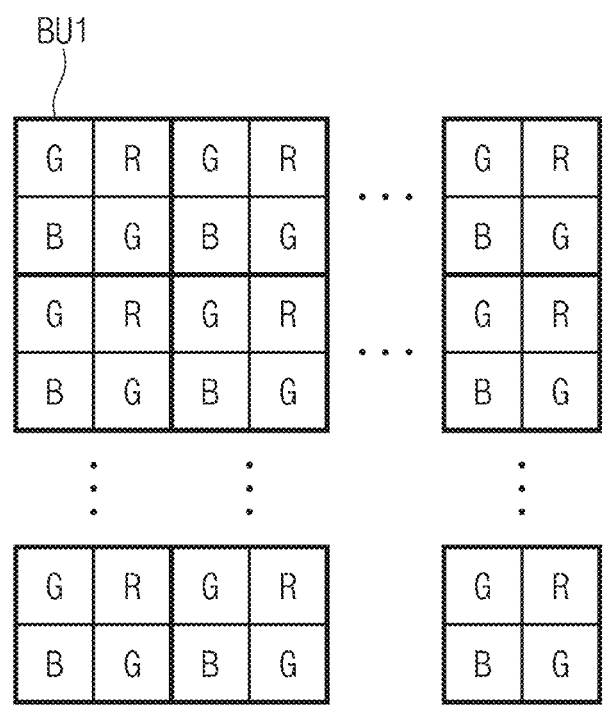
FIG. 2 illustrates an example of color filters arranged depending on a first-type array pattern of a first color filter array.

FIG. 2 illustrates an example of color filters arranged depending on the first-type array pattern of the first color filter array 113. Referring to FIGS. 1 and 2, the first color filter array 113 may include color filters for three colors: red R, green G, and blue B. The color filters of the first color filter array 113 may be arranged in rows and columns in units of a first basic unit BU1, depending on the first-type array pattern.

The first basic unit BU1 may include four color filters. The first basic unit BU1 may include G, R, G, and B color filters arranged sequentially in a clockwise direction from the leftmost end. In some example embodiments, the first-type array pattern of the first color filter array 113 may be a Bayer pattern.

The pixel array 114 may include pixels arranged in rows and columns. The pixels of the pixel array 114 may correspond to the color filters of the first color filter array 113, respectively. According to some example embodiments, each pixel of the pixel array 114 may correspond to a different color filter of the first color filter array 113. A pixel corresponding to the G color filter may output information corresponding to the amount of green light in the form of a current or a voltage.

A pixel corresponding to the R color filter may output information corresponding to the amount of red light in the form of a current or a voltage. A pixel corresponding to the B color filter may output information corresponding to the amount of blue light in the form of a current or a voltage.

The analog-to-digital block 115 may receive results of sensing the amounts of light at the pixels of the pixel array 114 (e.g., the current and/or voltage values output by the pixels of the pixel array 114). The received results may be of an analog form. The analog-to-digital block 115 may digitize the received results to generate image data. The image data may include (or may be composed of) pixel data corresponding to the pixels of the pixel array 114 (or generated from the pixels).

The first physical block 116 may receive the image data from the analog-to-digital block 115. The first physical block 116 may output the image data based on a corresponding communication protocol of various communication protocols. For example, the communication protocols may include a D-PHY and/or a C-PHY.

Because the first-type array pattern of the first color filter array 113 is the Bayer pattern, a signal output from the first physical block 116 may be a Bayer signal BS corresponding to the Bayer pattern.

The electronic device 120 may include processing circuitry (e.g., a computer) configured (or organized) to calibrate the image sensor 110 or a calibration device designed or manufactured to calibrate the image sensor 110. According to some example embodiments, the calibration device may be implemented using processing circuitry. The electronic device 120 may receive the Bayer signal BS from the image sensor 110.

The electronic device 120 may include a second physical block 121 (PHY2) and/or an image signal processor 122 (ISP). The second physical block 121 may have the same structure as or a similar structure to the first physical block 116 of the image sensor 110 and may be based on the same communication protocol as or a similar communication protocol to the first physical block 116. According to some example embodiments, operations described herein as being performed by the second physical block 121 (PHY2) and/or the image signal processor 122 (ISP) may be performed by processing circuitry.

The image signal processor 122 may be mounted in the electronic device 120 and may be configured to execute a library coded to calibrate the image sensor 110. Alternatively, the image signal processor 122 may include processing circuitry (e.g., an integrated circuit) that is designed and manufactured to calibrate the image sensor 110 and is mounted in the electronic device 120.

The image signal processor 122 may be implemented based on the Bayer signal BS (BS-based) and may process the Bayer signal BS that is based on the first-type array pattern, that is, the Bayer pattern. The image signal processor 122 may detect a resolution of the image sensor 110 from the Bayer signal BS and may transfer a feedback signal FBS for calibrating the resolution to the support 112 of the image sensor 110.

For example, the resolution may be determined by a distance between the lens 111 and the pixel array 114. The feedback signal FBS may include calibration information about the distance between the lens 111 and the pixel array 114. The support 112 may adjust the distance between the lens 111 and the pixel array 114 in response to the feedback signal FBS.

The image signal processor 122 may detect a tilt of the lens 111 of the image sensor 110 from the Bayer signal BS and may transfer the feedback signal FBS for calibrating the tilt to the support 112 of the image sensor 110.

For example, in the case where the lens 111 and the first color filter array 113 or the pixel array 114 are not parallel to each other, a phenomenon such as spreading may occur in a partial area of image data. The feedback signal FBS may include calibration information about the tilt of the lens 111. The support 112 may adjust the tilt of the lens 111 in response to the feedback signal FBS.

An example is illustrated in FIG. 1 as the feedback signal FBS is transferred to the support 112 and a resolution and a tilt are adjusted by the support 112. The image sensor calibration system 100 may further include an adjustment device for adjusting a resolution and/or a tilt of the image sensor 110. The feedback signal FBS may be transferred to the adjustment device, and the adjustment device may control the support 112 to adjust a resolution and/or a tilt of the image sensor 110. In some example embodiments, the adjustment device may be included in the electronic device 120. According to some example embodiments, the adjustment device may be implemented using processing circuitry.

Figure 3:
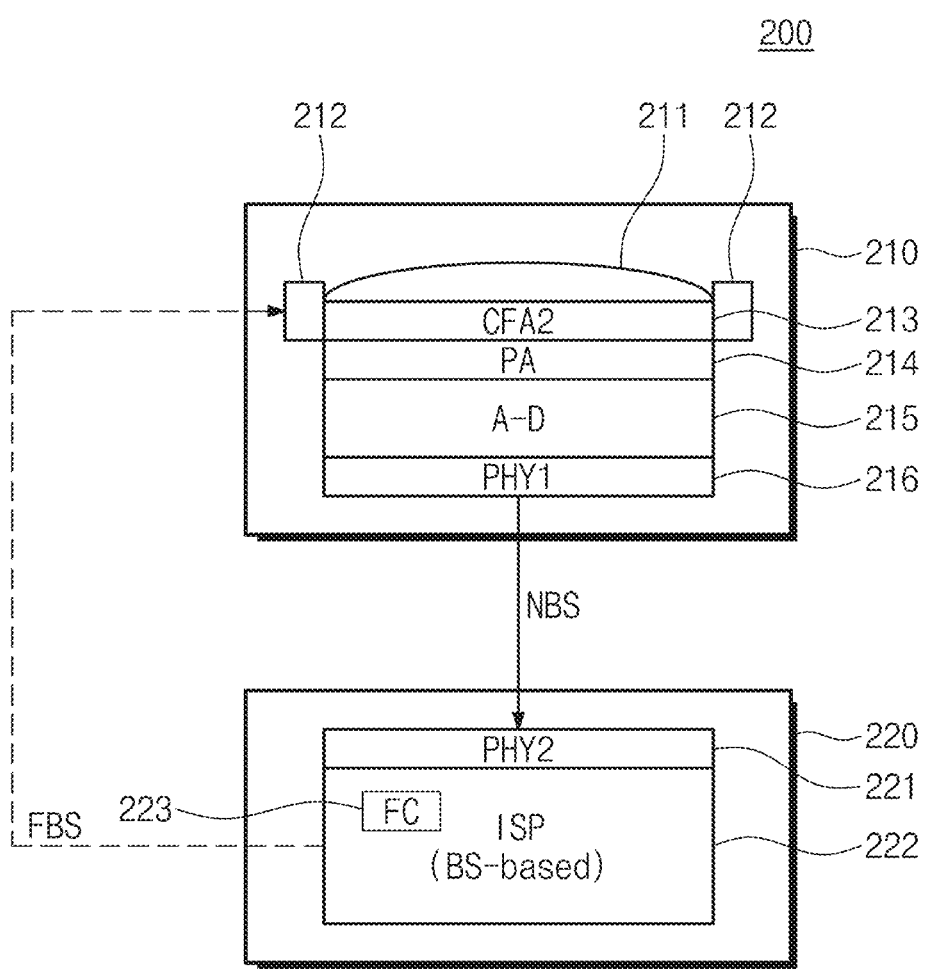
FIG. 3 illustrates an image sensor calibration system according to some example embodiments.

FIG. 3 illustrates an image sensor calibration system 200 according to some example embodiments. Referring to FIG. 3, the image sensor calibration system 200 may include an image sensor 210, and/or an electronic device 220 configured to calibrate the image sensor 210.

The image sensor 210 may be based on a CMOS image sensor (CIS) or a charge-coupled device (CCD). The image sensor 210 may include a lens 211, a support 212, a second color filter array 213 (CFA2), a pixel array 214 (PA), an analog-to-digital block 215 (A-D), and/or a first physical block 216 (PHY1). According to some example embodiments, operations described herein as being performed by the image sensor calibration system 200, the image sensor 210, the electronic device 220, the second color filter array 213 (CFA2), the pixel array 214 (PA), the analog-to-digital block 215 (A-D) and/or the first physical block 216 (PHY1) may be performed by processing circuitry.

Operations and/or configurations of the image sensor 210 may be identical or similar to those of the image sensor 110 of FIG. 1 except that the image sensor 210 includes the second color filter array 213 instead of the first color filter array 113. According to some example embodiments, the lens 211, the support 212, the pixel array 214 (PA), the analog-to-digital block 215 (A-D), and/or the first physical block 216 (PHY1) may be the same as or similar to the lens 111, the support 112, the pixel array 114 (PA), the analog-to-digital block 115 (A-D), and/or the first physical block 116 (PHY1), respectively. Thus, additional description will be omitted to avoid redundancy. The configurations, operations, and/or features described with regard to the image sensor 110 of FIG. 1 may be identically or similarly applied to the image sensor 210.

The second color filter array 213 may include color filters applied to light incident through the lens 211. The second color filter array 213 may have a second-type array pattern. The color filters of the second color filter array 213 may be arranged depending on the second-type array pattern. The second-type array pattern may be different from the Bayer pattern of the first-type array pattern.

Figure 4:
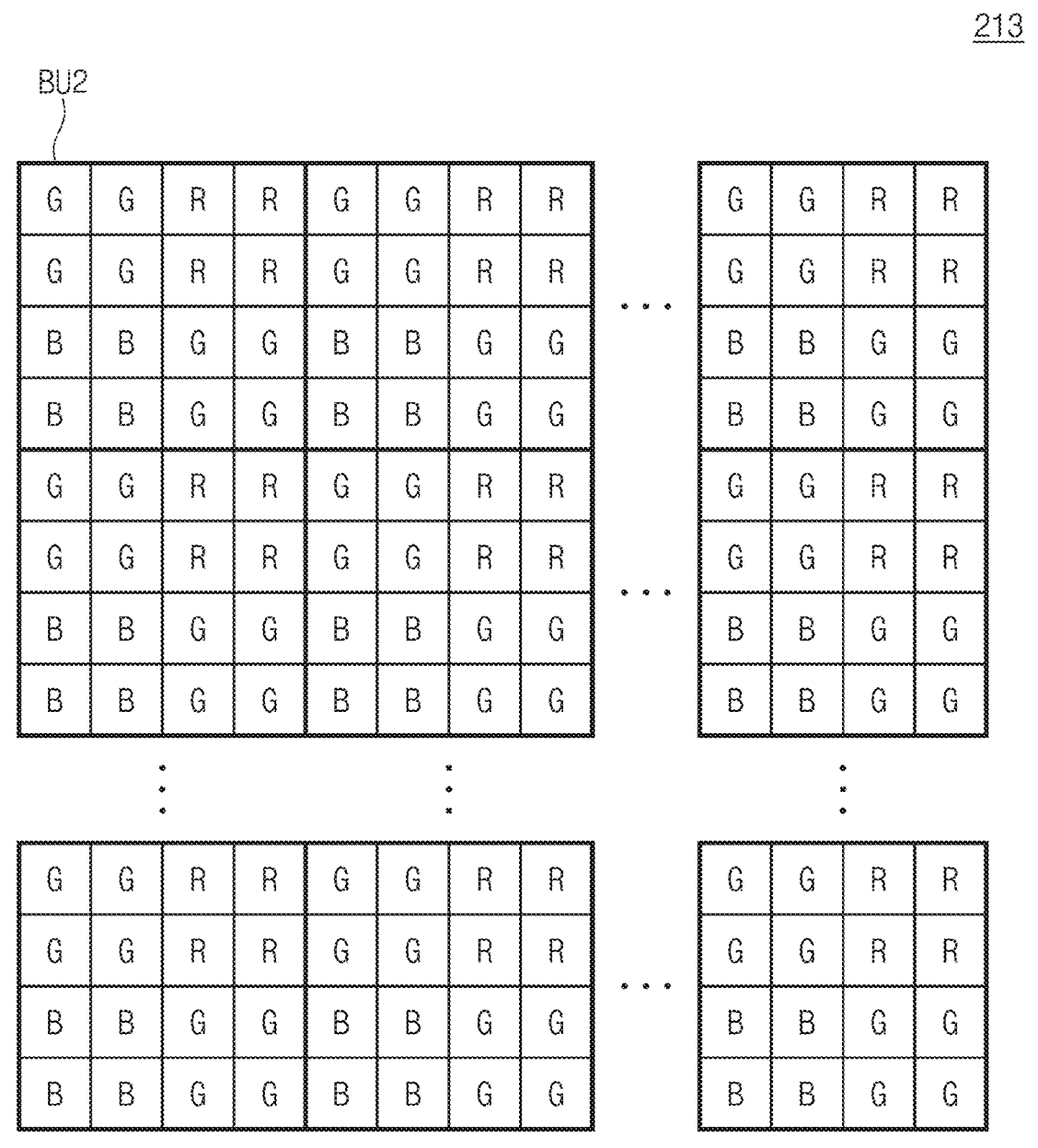

FIG. 4 illustrates an example of color filters arranged depending on the second-type array pattern of the second color filter array 213. Referring to FIGS. 3 and 4, the second color filter array 213 may include color filters for three colors: red R, green G, and blue B. The color filters of the second color filter array 213 may be arranged in rows and columns in units of a second basic unit BU2, depending on the second-type array pattern.

The second basic unit BU2 may include 16 color filters. In the case of equally dividing the second basic unit BU2 into four regions based on a horizontal axis and a vertical axis, the second basic unit BU2 may include four G color filters placed at upper left quadrant, four R color filters placed at upper right quadrant, four B color filters placed at lower left quadrant, and four G color filters placed at lower right quadrant.

In some example embodiments, the second basic unit BU2 may include three or more color filters that are disposed adjacent to each other and correspond to the same color or a similar color. The second-type array pattern of the second color filter array 213 may not be a Bayer pattern.

Because the second-type array pattern of the second color filter array 213 may not the Bayer pattern, a signal output from the first physical block 216 may be a non-Bayer signal NBS not corresponding to the Bayer pattern.

The electronic device 220 may include a computer configured (or organized) to calibrate the image sensor 210 or a calibration device designed or manufactured to calibrate the image sensor 210. The electronic device 220 may receive the non-Bayer signal NBS from the image sensor 210.

The electronic device 220 may include a second physical block 221 (PHY2) and/or an image signal processor 222 (ISP). The second physical block 221 may have the same structure as or a similar structure to the first physical block 216 of the image sensor 210 and may be based on the same communication protocol as or a similar communication protocol to the first physical block 216.

The image signal processor 222 may be mounted in the electronic device 220 and may be configured to execute a library coded to calibrate the image sensor 210. Alternatively, the image signal processor 222 may include processing circuitry (e.g., an integrated circuit) that is designed and manufactured to calibrate the image sensor 210 and is mounted in the electronic device 220.

The image signal processor 222 may be implemented based on the non-Bayer signal NBS. For the image signal processor 222 to process the non-Bayer signal NBS, the image signal processor 222 may convert the non-Bayer signal NBS into the Bayer signal BS.

Conventional devices and methods for performing image sensor calibration convert non-Bayer signals generated by an image signal processor into Bayer signals, including various operations for maintaining the quality of image data. However, this conversion of the non-Bayer signals into the Bayer signals causes excessive delay (e.g., delay greater than a reference time). Such excessive conversion delay results in excessive sensor calibration delay. The negative effects of this calibration delay are amplified when a large amount of image sensors are calibrated, such as during initial calibration performed by the image sensor manufacturer, further resulting in excessive manufacturing costs and delay.

However, the image signal processor 222 according to some example embodiments may provide a white balance operation and an inverse white balance operation that convert non-Bayer image data into Bayer image data faster than the conventional devices and methods the non-Bayer signal into the Bayer signal. Accordingly, the image signal processor 222 provides a reduced conversion delay (e.g., delay smaller than the reference time), and accordingly, a reduced calibration delay, and reduced manufacturing costs and delay than the conventional devices and methods.

A configuration and/or an operation of the image signal processor 222 of the electronic device 220 may be identical or similar to those of the image signal processor 122 of FIG. 1 except that the fast converter 223 is included in the image signal processor 222. Thus, additional description will be omitted to avoid redundancy. The configurations, operations, and/or features described with regard to the electronic device 120 of FIG. 1 may be identically or similarly applied to the electronic device 220. According to some example embodiments, operations described herein as being performed by the image signal processor 222, the fast converter 223 (FC) and/or the second physical block 221 (PHY2) may be performed by processing circuitry.

Figure 5:
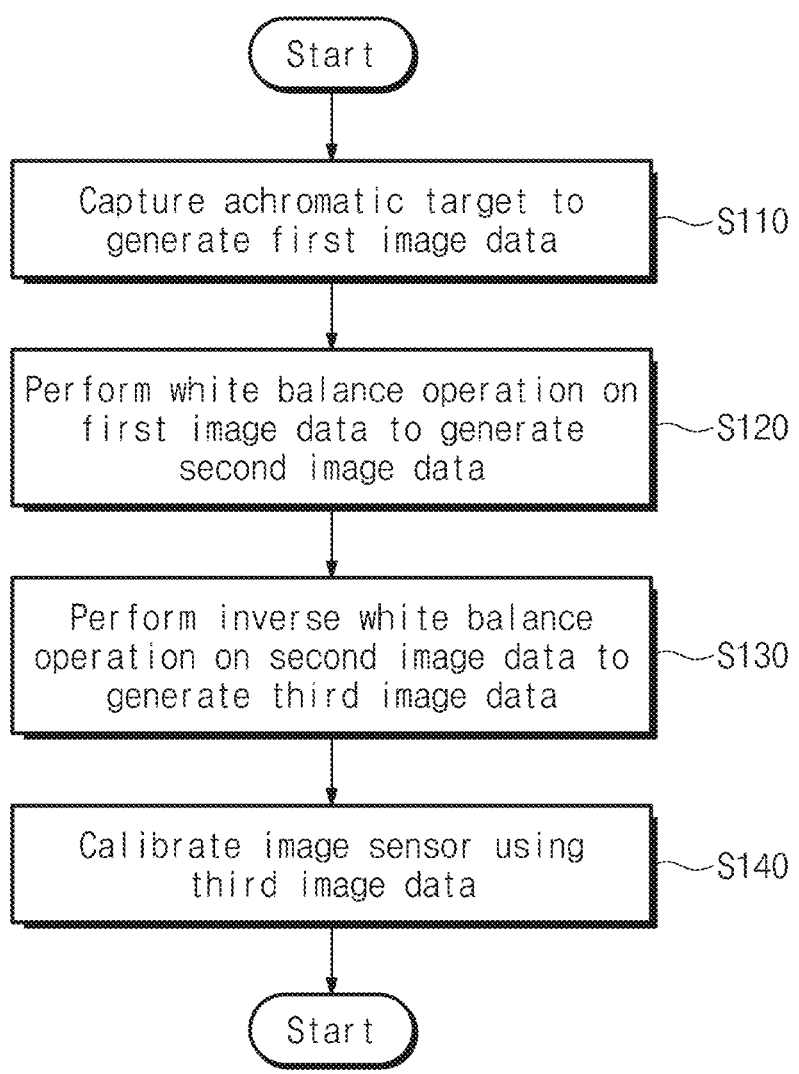
FIG. 5 illustrates an example of an image sensor calibration method according to some example embodiments.

FIG. 5 illustrates an example of an image sensor calibration method according to some example embodiments. Referring to FIGS. 3 and 5, in operation S110, an operation in which the image sensor 110 captures an achromatic target to generate first image data may be performed.

A color may be expressed by hue, chroma, and/or values. The chroma of the achromatic target may be "0". G, R, and B hue values of the achromatic target may be identical or similar. The achromatic target may have various values.

The achromatic target may include various patterns having various values such that information capable of calibrating a resolution and a tilt of the image sensor 210 is able to be obtained. For example, the ISO12233 resolution chart may be used as the achromatic target.

Operation S120 may be performed following operation S110. An operation of performing a white balance operation on the first image data to generate second image data may be performed in operation S120. The white balance operation may adjust gains of G, R, and B hues of light captured by the image sensor 210 after being reflected from a target.

In some example embodiments, the first image data may include information of light reflected from the achromatic target. Light transmittances (or sensitivities) of the G color filters, the R color filters, and/or the B color filters of the second color filter array 213 may be different from each other. Accordingly, intensities of the G, R, and/or B hues of the first image data of the achromatic target captured by the pixel array 214 of the image sensor 210 may be different from each other.

Figure 6:
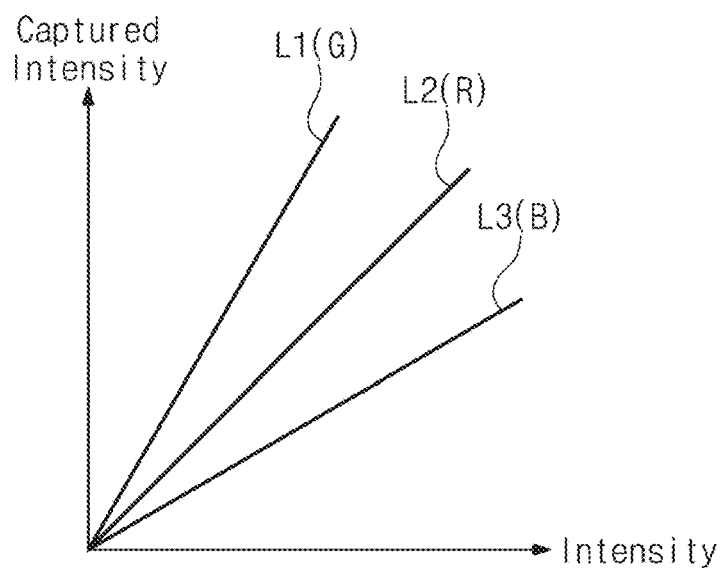
FIG. 6 illustrates intensities of G, R, and B hues of first image data according to the intensity of incident light.

FIG. 6 illustrates intensities of G, R, and B hues of first image data according to the intensity of incident light. In FIG. 6, a horizontal axis represents the intensity of incident light (e.g., a received intensity), and a vertical axis represents a captured intensity.

Referring to FIGS. 3 and 6, a first line L1 shows an intensity captured by a pixel corresponding to a G color filter. A second line L2 shows an intensity captured by a pixel corresponding to an R color filter. A third line L3 shows an intensity captured by a pixel corresponding to a B color filter.

As illustrated in FIG. 6, when light of the same intensity or a similar intensity reflected from the achromatic target not including a chroma is incident, an intensity captured through the G color filter may be greater than an intensity captured through the R color filter. Also, the intensity captured through the R color filter may be greater than an intensity captured through the B color filter.

That is, the first image data generated from the achromatic target may be chromatic image data having a chroma. The white balance operation may adjust gains of intensities of the G, R, and B hues of the first image data to generate the second image data (e.g., achromatic image data). According to some example embodiments, intensity gains corresponding to respective pixels of the first image data may be adjusted according to whether each of the respective pixels is associated with a G, R or B hues (in association with a corresponding G, R or B color filter).

Figure 7:
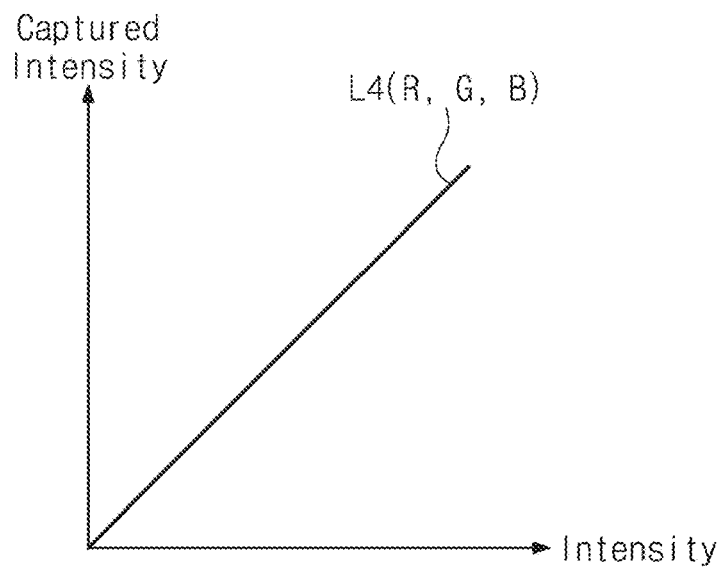
FIG. 7 illustrates intensities of G, R, and B hues of second image data according to the intensity of incident light.

FIG. 7 illustrates intensities of G, R, and B hues of second image data according to the intensity of incident light. In FIG. 7, a horizontal axis represents the intensity of incident light (e.g., a received intensity), and a vertical axis represents a captured intensity.

Referring to FIG. 7, a fourth line L4 shows intensities corresponding to G, R, and B color filters according to the intensity of incident light. In the second image data, intensities of G, R, and B hues of light of the same intensity or a similar intensity reflected from the achromatic target may be identical or similar.

The second image data may include information of an image captured from the achromatic target, and in the information of the second image data, intensities of G, R, and B hues may be calibrated to original G, R, and B hues of the achromatic target.

That is, the white balance operation may be an operation of adjusting gains of intensities of the G, R, and B hues of the first image data so as to be adjusted to an achromatic color. The second image data generated by the white balance operation may include achromatic information.

In some example embodiments, differences between captured intensities illustrated in FIG. 6 may be based on a characteristic of the second color filter array 213. The white balance operation may adjust gains of G, R, and B hues based on the characteristic of the second color filter array 213.

Because the white balance operation is performed on the first image data generated through the second color filter array 213, the white balance operation may be based on the second-type array pattern of the second color filter array 213.

Even though intensities of G, R, and B hues are calibrated in the process of converting the first image data into the second image data, shapes and different values of achromatic patterns captured from the achromatic target may be identically, or similarly, maintained. The shapes and different values of achromatic patterns may be used to calibrate the image sensor 210.

Returning to FIGS. 3 and 5, operation S130 may be performed following operation S120. In operation S130, an inverse white balance operation may be performed on the second image data, and third second image data may be generated. The inverse white balance operation may be based on the first-type array pattern of the first color filter array 113, that is, the Bayer pattern.

As described with reference to FIGS. 2 and 4, locations of the color filters according to the first-type array pattern of the first color filter array 113 are different from locations of the color filters according to the second-type array pattern of the second color filter array 213.

As described with reference to FIG. 5, to calibrate the image sensor 210, the first image data may be generated based on a result of capturing the achromatic target. Also, the second image data may be generated by performing the white balance operation on the first image data.

Intensities of G, R, and B hues of the achromatic target may be identical or similar, a chroma may be "0", and values may be various. Also, intensities of G, R, and B hues of the second image data may be identical or similar, a chroma may be "0", and values may be various. That is, the second image data may include all information about a color of the achromatic target.

The third image data corresponding to the first-type array pattern may be generated by adjusting gains of G, R, and B hues of the second image data (e.g., achromatic image data), so as to be opposite to the white balance operation.

Figure 8:
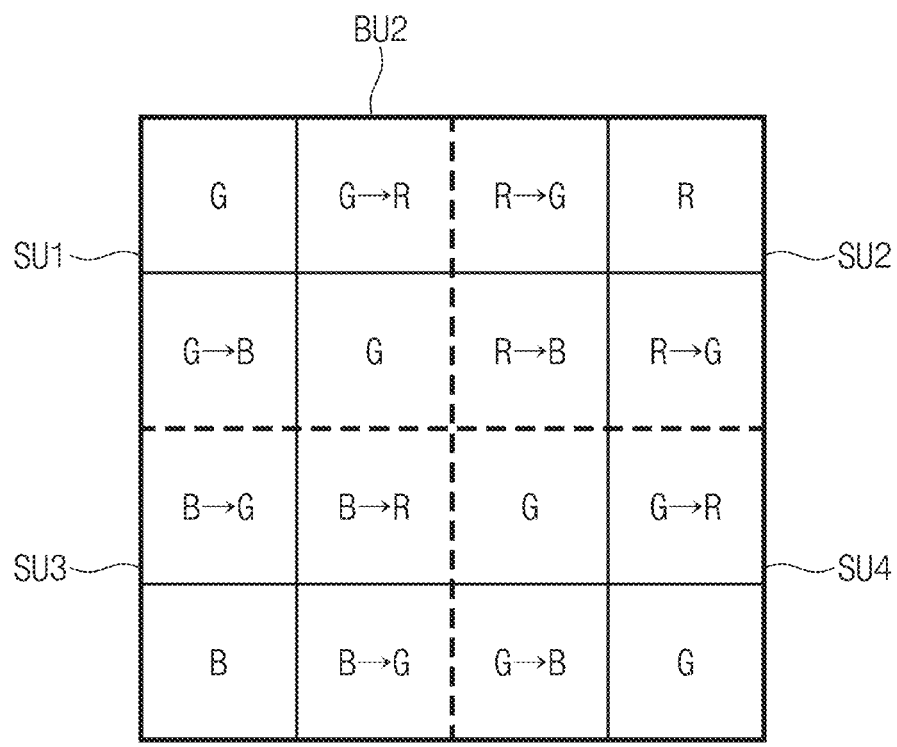
FIG. 8 illustrates an example in which an inverse white balance operation is performed with regard to a second color filter array.

FIG. 8 illustrates an example in which an inverse white balance operation is performed with regard to the second color filter array 213. Referring to FIGS. 2, 4, and 8, the second color filter array 213 may be divided into sub-units SU1 to SU4 of the same size as or a similar size to the first basic unit BU1. An example is illustrated in FIG. 8 as a size (or a granularity) of the second basic unit BU2 is an integer multiple (e.g., four times) of a size (or a granularity) of a sub-unit, but some example embodiments are not limited thereto.

In each sub-unit, color filters may be converted to correspond to the first-type array pattern. For example, in the first sub-unit SU1, one of G color filters may be converted into a R color filter (G→R), and another thereof may be converted into a B color filter (G→B). In the second sub-unit SU2, two of R color filters may be converted into G color filters (R→G), and another thereof may be converted into a B color filter (R→B).

In the third sub-unit SU3, two of B color filters may be converted into G color filters (B→G), and another thereof may be converted into a R color filter (B→R). In the fourth sub-unit SU4, one of G color filters may be converted into an R color filter (G→R), and another thereof may be converted into a B color filter (G→B). According to some example embodiments, converting a hue of a respective color filter into a different hue may include applying (e.g., adding, subtracting, multiplying, etc.) a defined value to the second image data corresponding to a pixel associated with the respective color filter to obtain the converted array pattern.

When color filters are converted as illustrated in FIG. 8, a converted color filter array may have the same array pattern as or a similar array pattern to the first-type array pattern. The inverse white balance operation may adjust gains of G, R, and/or B hues depending on the converted array pattern. According to some example embodiments, the gains applied to each pixel within the first image data used to generate the second image data during the white balance operation are stored, and opposite gains to the stored gains are applied to each pixel within the second image data corresponding to the converted array pattern to generate the third image data during the inverse white balance operation.

The inverse white balance operation may adjust the intensities of the G, R, and/or B hues of the second image data illustrated in FIG. 7 to the intensities of the G, R, and/or B hues illustrated in FIG. 6. The third image data generated by the inverse white balance operation may be identical or similar to image data captured from the achromatic target by using the first color filter array 113 having the first-type array pattern.

In some example embodiments, the differences between the captured intensities illustrated in FIG. 6 may be based on a characteristic of the second color filter array 213. The inverse white balance operation may adjust gains of G, R, and/or B hues based on the characteristic of the second color filter array 213.

Returning to FIGS. 3 and 5, operation S140 may be performed following operation S130. In operation S140, the image sensor 210 may be calibrated by using the third image data.

As described above, the calibration method according to some example embodiments includes generating first image data from an achromatic target, performing a white balance operation on the first image data to generate second image data, and performing an inverse white balance operation on the second image data to generate third image data corresponding to a Bayer pattern.

The third image data may be the Bayer signal BS based on the Bayer pattern. The white balance operation and the inverse white balance operation may be performed and completed during a time smaller than the reference time. For example, the above operations of the calibration method may be performed in real time in calibrating the image sensor 210. Accordingly, a calibration time of the image sensor 210 may decrease.

In some example embodiments, in calibrating an image sensor, at least a part of a target captured by an image sensor may be achromatic, and the remaining part thereof may include a chromatic color. In this case, the calibration method of FIG. 5 may be performed by using a portion of the achromatic part of the target.

In some example embodiments, generating the first image data by using the image sensor 210 may be performed in a calibration environment in which a color temperature is fixed. The white balance operation and the inverse white balance operation may be performed based on information of a fixed color temperature.

In some example embodiments, information of a color temperature in a calibration environment may be obtained before the first image data are generated by using the image sensor 210. The white balance operation and the inverse white balance operation may be performed based on information of a fixed color temperature.

Figure 9:
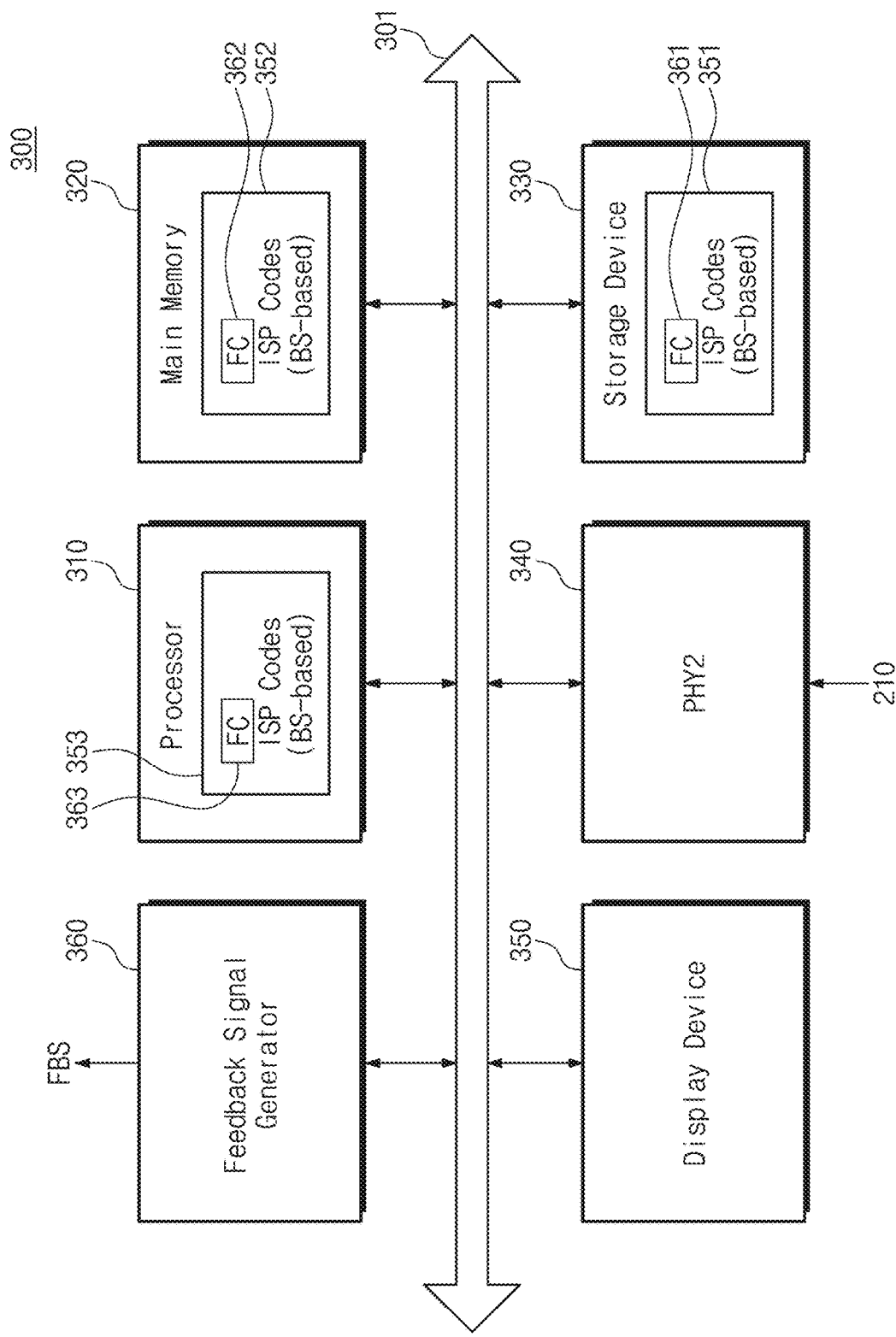
FIG. 9 illustrates an example of an electronic device configured to calibrate an image sensor.

FIG. 9 illustrates an example of an electronic device 300 configured to calibrate an image sensor. The electronic device 300 may correspond to the electronic device 220 of FIG. 3. Referring to FIGS. 3 and 9, the electronic device 300 may include a bus 301, processing circuitry (e.g., a processor) 310, a main memory 320, a storage device 330, a second physical block 340, a display device 350, and/or a feedback signal generator 360. According to some example embodiments, operations described herein as being performed by the electronic device 300, the second physical block 340 and/or the feedback signal generator 360 may be performed by processing circuitry (e.g., the processing circuitry 310).

The bus 301 may provide channels (e.g., communication and/or power channels) between the components of the electronic device 300. The processing circuitry 310 may control an operation of the electronic device 300 and may execute an operating system and applications. The processing circuitry 310 may be a general-purpose processor or a special purpose processor designed and manufactured to calibrate an image sensor.

The main memory 320 may be accessed by the processing circuitry 310. The main memory 320 may temporarily store codes and/or data that the processing circuitry 310 may execute. The main memory 320 may include a DRAM, an SRAM, and/or a storage class RAM (SCRAM).

The storage device 330 may be a nonvolatile memory that may store codes and/or data that may be used in the electronic device 300. The storage device 330 may include various storage devices such as a hard disk drive (HDD), a solid state drive (SSD), and/or an optical disk drive (ODD).

The storage device 330 may include image signal processing codes 351 (ISP Codes). The image signal processing codes 351 may include various codes and/or data for calibrating the image sensor 210 by using BS-based image data.

The image signal processing codes 351 and/or storage device 330 may include a fast converter 361 (FC). As described with reference to FIG. 5, the fast converter 361 may include codes and/or data for performing the white balance operation and/or the inverse white balance operation on a non-Bayer signal to convert the non-Bayer signal NBS into the Bayer signal BS. According to some example embodiments, operations described herein as being performed by the fast converter 361 (FC) may be performed by processing circuitry.

The processing circuitry 310 may load the image signal processing codes 351 including the fast converter 361 or a part of the image signal processing codes 351 onto the main memory 320. The processing circuitry 310 may fetch a particular code or data from the image signal processing codes 351 (depicted as the image signal processing codes 352 when loaded on the main memory 320) including the fast converter 361 (depicted as the fast converter 362 when loaded on the main memory 320), which are loaded onto the main memory 320, or a part of the image signal processing codes 351.

The processing circuitry 310 may receive the first image data from the image sensor 210 through the second physical block 340 (PHY2).

The processing circuitry 310 may execute the fetched image signal processing codes 351 (depicted as the image signal processing codes 353 when executed on the processing circuitry 310) including the fast converter 361 (depicted as the fast converter 363 when loaded on the processing circuitry 310) and may perform operations for calibrating the image sensor 210 based on the first image data. For example, the processing circuitry 310 may execute the fast converter 361 to generate the third image data (e.g., the Bayer signal BS). Also, the processing circuitry 310 may execute the image signal processing codes 351 and may calculate information for adjusting a resolution and/or a tilt of the image sensor 210 from the third image data.

The processing circuitry 310 may display a result of the calculation through the display device 350. Also, based on the calculation result, the processing circuitry 310 may allow the feedback signal generator 360 to generate the feedback signal FBS including information for adjusting the resolution and/or the tilt of the image sensor 210.

Figure 10:
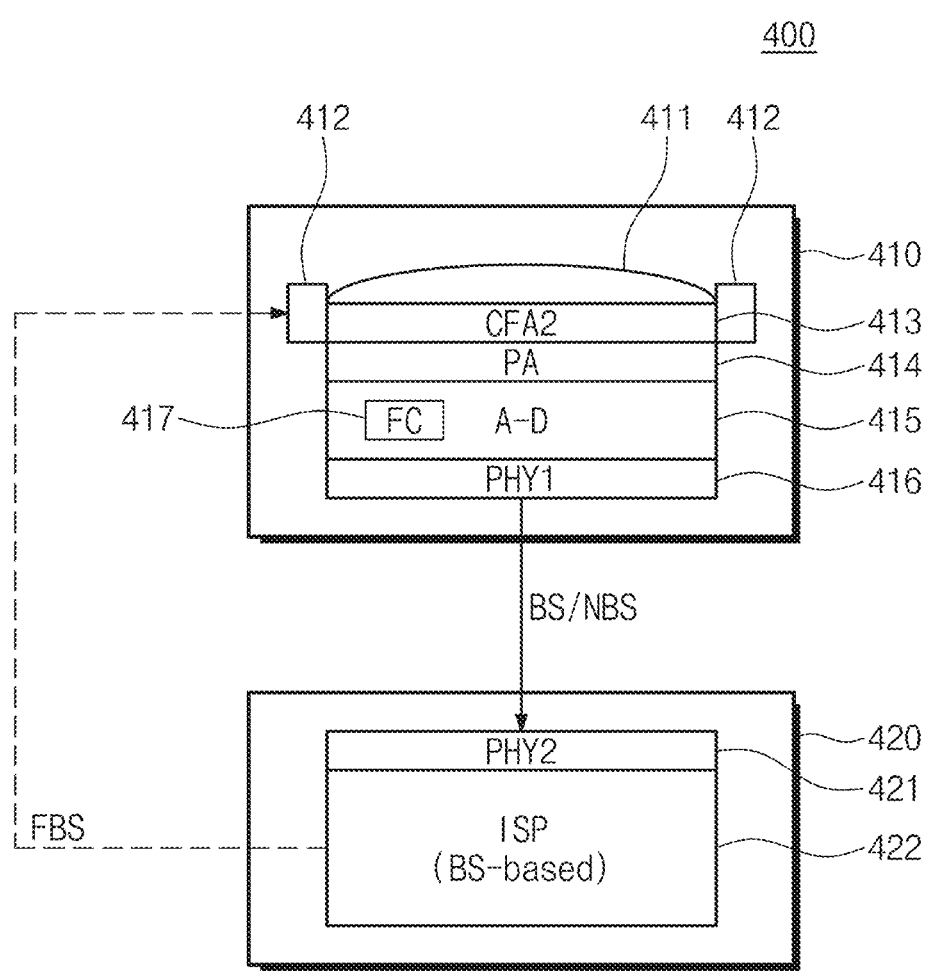
FIG. 10 illustrates an image sensor calibration system according to some example embodiments.

FIG. 10 illustrates an image sensor calibration system 400 according to some example embodiments. Referring to FIG. 10, the image sensor calibration system 400 may include an image sensor 410, and/or an electronic device 420 configured to calibrate the image sensor 410.

The image sensor 410 may be based on a CMOS image sensor (CIS) or a charge-coupled device (CCD). The image sensor 410 may include a lens 411, a support 412, a second color filter array 413 (CFA2), a pixel array 414 (PA), an analog-to-digital block 415 (A-D), and/or a first physical block 416 (PHY1). According to some example embodiments, operations described herein as being performed by the image sensor calibration system 400, the image sensor 410, the electronic device 420, the second color filter array 413 (CFA2), the pixel array 414 (PA), the analog-to-digital block 415 (A-D) and/or the first physical block 416 (PHY1) may be performed by processing circuitry.

Configurations and/or operations of the image sensor 410 may be identical or similar to those of the image sensor 210 of FIG. 3 except that a fast converter 417 (FC) is included in the analog-to-digital block 415. According to some example embodiments, the lens 411, the support 412, the second color filter array 413 (CFA2), the pixel array 414 (PA), and/or the first physical block 416 (PHY1) may be the same as or similar to the lens 211, the support 212, the second color filter array 213 (CFA2), the pixel array 214 (PA), the analog-to-digital block 215 (A-D), and/or the first physical block 216 (PHY1), respectively. Thus, additional description will be omitted to avoid redundancy. The configurations, operations, and/or features described with regard to the image sensor 210 of FIG. 3 may be identically or similarly applied to the image sensor 410.

The analog-to-digital block 415 may include the fast converter 417. In a first mode, the analog-to-digital block 415 may activate the fast converter 417. In a second mode, the analog-to-digital block 415 may deactivate the fast converter 417. The fast converter 417 thus activated may perform the white balance operation and/or the inverse white balance operation described with reference to FIG. 5. That is, when the fast converter 417 is activated, the image sensor 410 may output the Bayer signal BS. When the fast converter 417 is deactivated, the image sensor 410 may output the non-Bayer signal NBS. According to some example embodiments, operations described herein as being performed by the fast converter 417 (FC) may be performed by processing circuitry.

The electronic device 420 may include processing circuitry (e.g., a computer) configured (or organized) to calibrate the image sensor 410, or a calibration device designed or manufactured to calibrate the image sensor 410. The electronic device 420 may receive the Bayer signal BS from the image sensor 410. According to some example embodiments, operations described herein as being performed by the calibration device may be performed by processing circuitry.

The electronic device 420 may include a second physical block 421 (PHY2) and/or an image signal processor 422 (ISP). The second physical block 421 may have the same structure as or a similar structure to the first physical block 416 of the image sensor 410 and may be based on the same communication protocol as or a similar communication protocol to the first physical block 416. According to some example embodiments, operations described herein as being performed by the second physical block 421 (PHY2) and/or the image signal processor 422 (ISP) may be performed by processing circuitry.

The image signal processor 422 may be mounted in the electronic device 420 and may be configured to execute a library coded to calibrate the image sensor 410. Alternatively, the image signal processor 422 may include processing circuitry (e.g., an integrated circuit) that is designed and manufactured to calibrate the image sensor 410 and is mounted in the electronic device 420. The image signal processor 422 may be implemented based on the Bayer signal BS.

Figure 11:
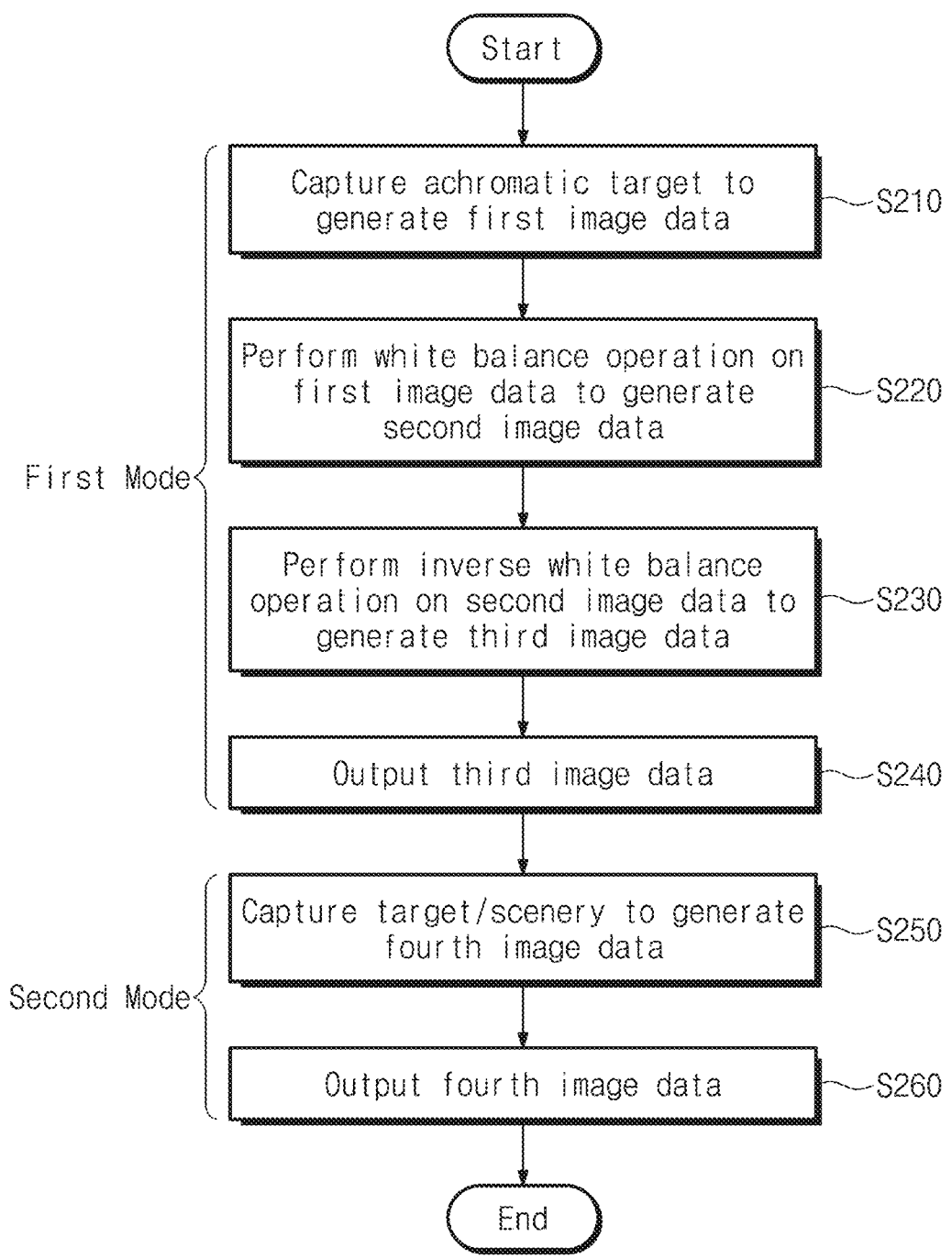
FIG. 11 illustrates an example of an operation method of an image sensor of FIG. 10.

FIG. 11 illustrates an example of an operation method of the image sensor 410 of FIG. 10. Referring to FIGS. 10 and 11, the image sensor 410 may operate in one mode of the first mode and the second mode. The first mode may be a calibration mode for calibrating the image sensor 410. The second mode may be a normal operating mode in which the image sensor 410 is mounted in a mobile device to create image content.

The first mode may include operation S210 to operation S240. In the first mode, the fast converter 417 may be activated. Operation S210 to operation S230 of the first mode may be performed to be identical or similar to operation S110 to operation S130 of FIG. 5. The image sensor 410 may generate the first image data from the achromatic target, may perform the white balance operation on the first image data to generate the second image data, and may perform the inverse white balance operation on the second image data to generate the third image data.

In operation S240 of the first mode, the image sensor 410 may output the third image data as the Bayer signal BS. The third image data may be output to a calibration device configured to calibrate the image sensor 410 (e.g., the electronic device 420).

The second mode may include operation S250 and operation S260. In the second mode, the fast converter 417 may be deactivated. In operation S250 of the second mode, the image sensor 410 may capture a target and/or a scenery to generate fourth image data. In operation S260, the image sensor 410 may output the fourth image data as the non-Bayer signal NBS.

The fourth image data may be output to processing circuitry (e.g., a processor) of a device (e.g., a mobile device) in which the image sensor 410 is mounted after the image sensor 410 is completely calibrated.

Figure 12:
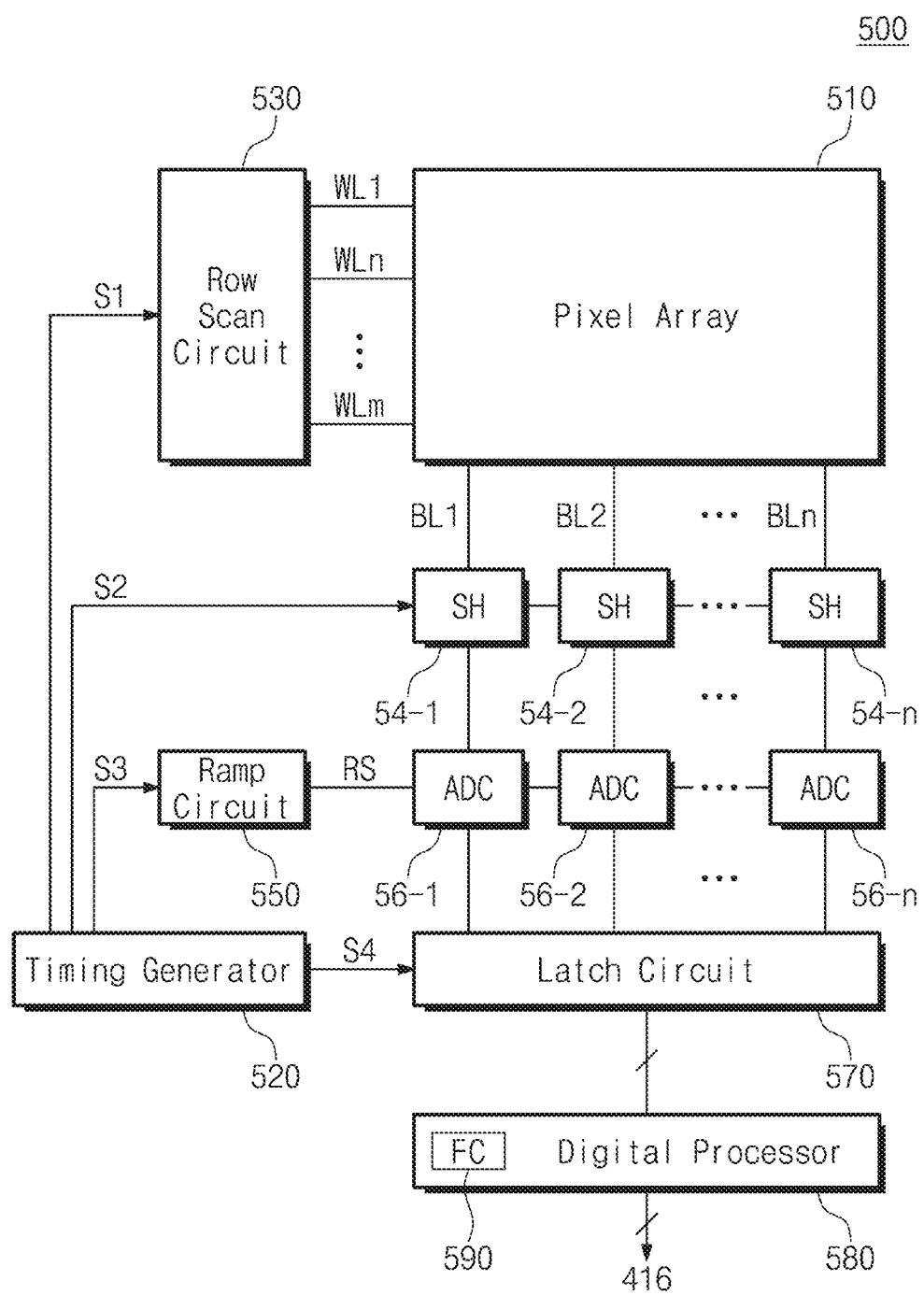
FIG. 12 illustrates components of an image sensor according to some example embodiments.

FIG. 12 illustrates components of an image sensor 500 according to some example embodiments. The image sensor 500 may correspond to the image sensor 410 of FIG. 10. Referring to FIGS. 10 and 12, the image sensor 500 may include a pixel array 510, a timing generator 520, a row scan circuit 530, first to n-th sample and hold circuits 54-1 to 54-$n$ (SH), a ramp circuit 550, first to n-th analog-to-digital converters 56-1 to 56-$n$ (ADC), a latch circuit 570, and/or a digital processor 580. According to some example embodiments, operations described herein as being performed by the image sensor 500, the pixel array 510, the timing generator 520, the row scan circuit 530, the first to n-th sample and hold circuits 54-1 to 54-$n$ (SH), the ramp circuit 550, the first to n-th analog-to-digital converters 56-1 to 56-$n$ (ADC), the latch circuit 570 and/or the digital processor 580 may be performed by processing circuitry.

The pixel array 510 may include pixels (e.g., image sensor pixels) arranged in rows and columns. The pixel array 510 may correspond to the pixel array 414 of FIG. 10. The pixel array 510 may generate image data in a scanning way to sequentially select the rows of the pixels. Pixels in a selected row may convert and output the amount of incident light in the form of a current and/or a voltage. In some example embodiments, the second color filter array 413 and the lens 411 on the pixel array 510 may be omitted in FIG. 12.

The timing generator 520 may provide a first signal S1 to the row scan circuit 530, may provide a second signal S2 to the first to n-th sample and hold circuits 54-1 to 54-$n$, may provide a third signal S3 to the ramp circuit 550, and/or may provide a fourth signal S4 to the latch circuit 570. The timing generator 520 may control the first signal S1, the second signal S2, the third signal S3, and/or the fourth signal S4 such that the row scan circuit 530, the first to n-th sample and hold circuits 54-1 to 54-$n$, the ramp circuit 550, and/or the latch circuit 570 operate at appropriate timings.

The row scan circuit 530 is connected to the rows of the pixels in the pixel array 510 through first to m-th word lines WL1 to WLm. The row scan circuit 530 may sequentially select the first to m-th word lines WL1 to WLm in response to the first signal S1. The row scan circuit 530 may apply an active voltage (e.g., a positive voltage) to a selected word line and may apply an inactive voltage (e.g., a ground voltage) to unselected word lines.

The first to n-th sample and hold circuits 54-1 to 54-$n$ may be connected with the columns of the pixels of the pixel array 510 through first to n-th bit lines BL1 to BLn. The first to n-th sample and hold circuits 54-1 to 54-$n$ may sense voltages and/or currents of the first to n-th bit lines BL1 to BLn in response to the second signal S2 and may hold the sensed voltages and/or currents.

The ramp circuit 550 may generate a ramp signal RS having a gradually increasing (or decreasing) level in response to the third signal S3. The ramp signal RS generated by the ramp circuit 550 may be provided to the first to n-th analog-to-digital converters 56-1 to 56-$n$.

The first to n-th analog-to-digital converters 56-1 to 56-$n$ may receive the ramp signal RS from the ramp circuit 550 and may receive the voltages and/or currents held by the first to n-th sample and hold circuits 54-1 to 54-$n$. The first to n-th analog-to-digital converters 56-1 to 56-$n$ may compare the received voltages (and/or currents) with the ramp signal RS and may generate digital values based on comparison results.

The latch circuit 570 may sequentially store the digital values received from the first to n-th analog-to-digital converters 56-1 to 56-$n$ in response to the fourth signal S4. The latch circuit 570 may transfer the stored digital values to the digital processor 580.

The digital processor 580 may perform follow-up processing on the digital values. For example, the digital processor 580 may include a fast converter 590. The fast converter 590 may perform the white balance operation and/or the inverse white balance operation. The digital processor 580 may be configured to activate or deactivate the fast converter 590 depending on an operating mode of the image sensor 500. According to some example embodiments, operations described herein as being performed by the fast converter 590 may be performed by processing circuitry.

The digital processor 580 may transfer image data as the Bayer signal BS, or image data as the non-Bayer signal NBS, to the first physical block 416. The timing generator 520, the row scan circuit 530, the first to n-th sample and hold circuits 54-1 to 54-$n$, the ramp circuit 550, the first to n-th analog-to-digital converters 56-1 to 56-$n$, the latch circuit 570, and/or the digital processor 580 may be included in the analog-to-digital block 415.

Figure 13:
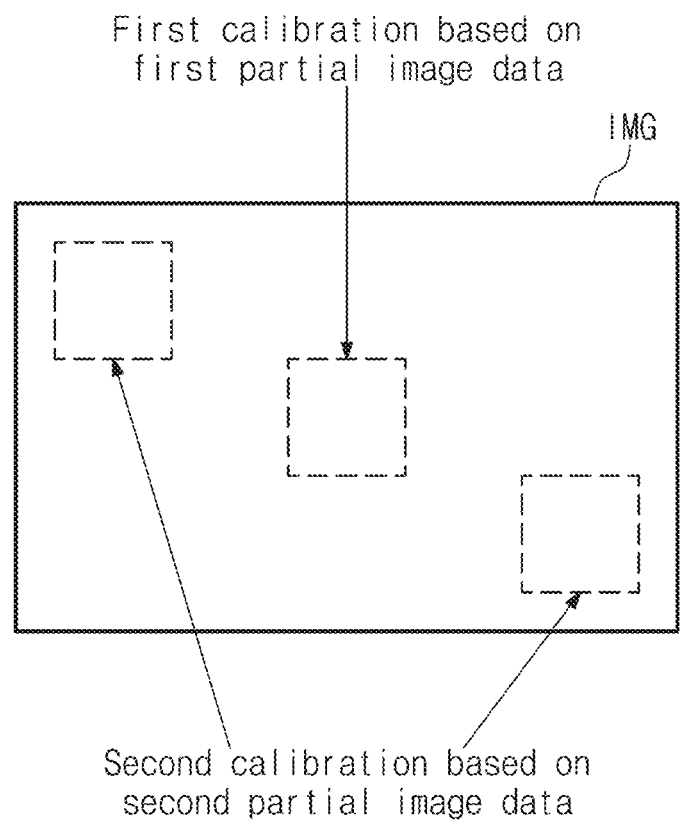
FIG. 13 illustrates an example in which an image sensor is calibrated by using a portion of image data.

FIG. 13 illustrates an example in which an image sensor is calibrated by using a portion of image data IMG. Referring to FIGS. 3, 10, and 13, the image data IMG may be, for example, analog image data captured by the pixel array 214 or 414. The analog-to-digital block 215 or 415 may perform analog-to-digital conversion on a part of the analog image data.

The calibration operation of FIG. 5 may be performed by the electronic device 220, based on the analog-to-digital converted data. Alternatively, the operation of the first mode of FIG. 11 may be performed by the analog-to-digital block 415, and the calibration may be performed by the electronic device 420.

For another example, the image data IMG may be the first image data generated by the analog-to-digital block 215. The analog-to-digital block 215 may output all or a part of the first image data to the electronic device 220. The electronic device 220 may perform the calibration operation of FIG. 5 based on a part of the first image data. Alternatively, the analog-to-digital block 415 may perform the operations of the first mode of FIG. 11 based on a part of the first image data.

In some example embodiments, a first calibration operation and a second calibration operation that are different may be performed based on first partial image data and second partial image data of the image data IMG.

In some example embodiments, above-described components are described by using the terms "first", "second", "third", and the like. However, the terms "first", "second", "third", and the like may be used to distinguish components from each other and do not limit some example embodiments. For example, the terms "first", "second", "third", and the like do not involve an order or a numerical meaning of any form.

In some example embodiments, above-described components are described by using blocks. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP).

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

Spatially relative terms, such as "beneath," "below," "lower," "above," "upper" and the like, may be used herein for ease of description to describe one element or feature's relationship to another element(s) or feature(s) as illustrated in the figures. For example, as used herein, the terms "upper," "higher," "on" and/or "top" may refer to an element or feature further in a first direction with respect to another element or feature, and the terms "lower," "under" and/or "below" may refer to an element or feature further in a direction opposite the first direction with respect to another element or feature. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

According to some example embodiments, image data obtained by an image sensor having a first-type color filter array are converted into image data corresponding to a second-type color filter array based on white balancing and inverse white balancing. The image sensor may be calibrated based on the converted image data. Because the operation of converting the image data corresponding to the first-type color filter array into the image data corresponding to the second-type color filter array is performed based on the white balancing and the inverse white balancing, the time spent calibrating the image sensor is reduced.

While some example embodiments have been described with reference to examples thereof, it will be apparent to those of ordinary skill in the art that various changes and modifications may be made thereto without departing from the spirit and scope of some example embodiments as set forth in the following claims.

What is claimed is:

1. A method of calibrating an image sensor including a color filter array having a first-type array pattern, the method comprising:
    capturing a target using the image sensor to generate first image data;
    performing a white balance operation on the first image data to generate second image data;
    performing an inverse white balance operation on the second image data based on a second-type array pattern to generate third image data, the second-type array pattern being different from the first-type array pattern; and
    calibrating the image sensor based on the third image data,
    wherein
        each of the first image data, the second image data, and the third image data includes pixel data corresponding to a plurality of pixels of the image sensor, and
        the performing the inverse white balance operation includes converting the pixel data corresponding to at least one of three or more pixels among the plurality of pixels to have a color different from an original color.

2. The method of claim 1, wherein the second-type array pattern is a Bayer pattern.

3. The method of claim 1, wherein the first-type array pattern includes three or more color filters adjacent to each other, each of the three or more color filters corresponding to a same particular color.

4. The method of claim 3, wherein the three or more pixels corresponding to the three or more color filters.

5. The method of claim 1, wherein the target includes an achromatic color.

6. The method of claim 5, wherein the calibrating the image sensor calibrates the image sensor based on a part of the third image data corresponding to the achromatic color.

7. The method of claim 1, wherein
    the image sensor further includes
        a plurality of pixels under the color filter array, and
        a lens on the color filter array; and the calibrating the image sensor includes adjusting at least one of a tilt of the lens or a resolution of the image sensor based on the third image data.

8. The method of claim 1, wherein the capturing, the performing the white balance operation, and the performing the inverse white balance operation are performed by the image sensor.

9. The method of claim 1, wherein the capturing is performed by the image sensor, and the performing the white balance operation and the performing the inverse white balance operation are performed by processing circuitry for calibrating the image sensor.

10. The method of claim 1, wherein the capturing comprises:
digitizing a portion of information captured by the image sensor to generate the first image data.

11. The method of claim 1, wherein the capturing comprises:
digitizing a portion of information captured by the image sensor to generate fourth image data including the first image data.

12. An image sensor comprising:
a lens;
a color filter array under the lens, the color filter array including a plurality of color filters having a first array pattern;
a pixel array under the color filter array, the pixel array including a plurality of pixels respectively corresponding to the plurality of color filters, and the pixel array being configured to sense light incident through the lens and the color filter array; and
processing circuitry configured to
digitize the light sensed by the pixel array to generate first image data,
perform a white balance operation on the first image data to generate second image data, and
perform an inverse white balance operation on the second image data based on a second array pattern to generate third image data, the second array pattern being different from the first array pattern,
wherein
the processing circuitry is configured to perform the white balance operation and perform the inverse white balance operation in a first mode, and
the processing circuitry is configured to output the first image data in a second mode.

13. The image sensor of claim 12, wherein the image sensor is configured to:
output the third image data to an external device configured to calibrate the image sensor; and
output the first image data to a device in which the image sensor is mounted.

14. The image sensor of claim 12, wherein the processing circuitry is configured to digitize a part of the light sensed by the pixel array to generate the first image data.

15. The image sensor of claim 12, wherein the processing circuitry is configured to digitize a part of the light sensed by the pixel array to generate fourth image data, the first image data being a part of the fourth image data.

16. An electronic device comprising:
processing circuitry configured to
perform a white balance operation on first image data received from an image sensor to generate second image data, the image sensor including a color filter array of a first-type array pattern,
perform an inverse white balance operation on the second image data based on a second-type array pattern to generate third image data, the second-type array pattern being different from the first-type array pattern, and
generate a signal for calibrating the image sensor based on the third image data,
wherein
each of the first image data, the second image data, and the third image data includes pixel data corresponding to a plurality of pixels of the image sensor; and
the processing circuitry is configured to perform the inverse white balance operation including converting the pixel data corresponding to at least one of three or more pixels among the plurality of pixels to have a color different from an original color.

17. The electronic device of claim 16, wherein the signal includes information about a resolution of the image sensor and a tilt of a lens of the image sensor.

18. The electronic device of claim 16, wherein the first-type array pattern includes three or more color filters adjacent to each other, the three or more color filters corresponding to a same particular color, the second-type array pattern being a Bayer pattern.

19. The electronic device of claim 18, wherein
the three or more pixels corresponding to the three or more color filters.

* * * * *